United States Patent
Takahashi et al.

(10) Patent No.: US 10,919,424 B2
(45) Date of Patent: Feb. 16, 2021

(54) MOLDED FOAM BODY

(71) Applicant: BRIDGESTONE CORPORATION, Tokyo (JP)

(72) Inventors: Yoshiyuki Takahashi, Tokyo (JP); Taisuke Yonezawa, Tokyo (JP); Yukiko Tsugawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 14 days.

(21) Appl. No.: 16/490,148

(22) PCT Filed: Jan. 25, 2018

(86) PCT No.: PCT/JP2018/002221
§ 371 (c)(1),
(2) Date: Aug. 30, 2019

(87) PCT Pub. No.: WO2018/211744
PCT Pub. Date: Nov. 22, 2018

(65) Prior Publication Data
US 2020/0047649 A1   Feb. 13, 2020

(30) Foreign Application Priority Data

May 16, 2017   (JP) .................. 2017-097437

(51) Int. Cl.
*B60N 2/64*   (2006.01)
*B60N 2/70*   (2006.01)
(Continued)

(52) U.S. Cl.
CPC .............. *B60N 2/70* (2013.01); *A47C 7/029* (2018.08); *A47C 7/18* (2013.01); *B29D 99/0092* (2013.01);
(Continued)

(58) Field of Classification Search
CPC ..... A47C 27/148; A47C 27/142; A47C 27/14; A47C 27/15; A47C 27/16; A47C 7/029; A47C 7/18; B60N 2/70; B29D 99/0092
See application file for complete search history.

(56) References Cited

U.S. PATENT DOCUMENTS 3,890,004 A * 6/1975 Rail ................ A47C 3/16
                                                  297/423.1
4,379,856 A * 4/1983 Samaritter ............ B60N 2/70
                                                  521/51
(Continued)

FOREIGN PATENT DOCUMENTS

EP    2987430 A1    2/2016
JP    49-027362 A    3/1974
(Continued)

OTHER PUBLICATIONS

Communication dated Mar. 23, 2020, from the European Patent Office in Application No. 18801982.2.
(Continued)

*Primary Examiner* — Syed A Islam
(74) *Attorney, Agent, or Firm* — Sughrue Mion, PLLC

(57) ABSTRACT

According to the present invention, in a plan view of a seat surface (10a), a plane area of a part surrounded by an inner edge (17a) of a rear part (17) in a left-right direction (X) and a contour (L) is larger than a plane area of a part sandwiched by an inner edge (18a) of a front part (18) in the left-right direction (X) and the contour (L) in the left-right direction (X). In addition, a part of a pair of left and right second synthetic resin materials forming a lower part having a maximum gap therebetween in the left-right direction (X) is positioned in a thigh rest part (14) and a part having a minimum gap is positioned in a hip rest part (15), and a maximum value (W1) of the gap between the pair of left and right second synthetic resin materials forming the lower part (Continued)

in the left-right direction (X) is two times or more a minimum value (W2) of the gap in the left-right direction (X).

19 Claims, 6 Drawing Sheets

(51) Int. Cl.
    *A47C 7/02*      (2006.01)
    *A47C 7/18*      (2006.01)
    *B29D 99/00*  (2010.01)
    *B29K 105/04*    (2006.01)
    *A47C 27/14*     (2006.01)
    *A47C 27/16*     (2006.01)
    *A47C 27/15*     (2006.01)

(52) U.S. Cl.
    CPC ............ *A47C 27/14* (2013.01); *A47C 27/142* (2013.01); *A47C 27/148* (2013.01); *A47C 27/15* (2013.01); *A47C 27/16* (2013.01); *B29K 2105/04* (2013.01)

(56) References Cited

U.S. PATENT DOCUMENTS

| | | | |
|---|---|---|---|
| 4,726,624 A | | 2/1988 | Jay |
| 5,544,942 A | * | 8/1996 | Vu Khac ............... A47C 7/18 297/452.37 |
| 5,671,492 A | * | 9/1997 | Simon ............... A47C 27/144 5/722 |
| 6,093,351 A | * | 7/2000 | Ogawa ............... B29C 44/025 264/46.4 |
| 7,946,655 B2 | * | 5/2011 | Hsu ............... A47C 7/029 297/452.46 |
| 9,573,504 B2 | * | 2/2017 | Nakada ............... A47C 27/15 |
| 9,751,443 B2 | * | 9/2017 | Tabata ............... B60N 2/58 |
| 9,962,002 B2 | * | 5/2018 | Nakada ............... B60N 2/4263 |
| 9,994,136 B2 | * | 6/2018 | Nakada ............... A47C 27/148 |
| 10,035,440 B2 | * | 7/2018 | Nakada ............... B60N 2/646 |
| 10,086,727 B1 | * | 10/2018 | Ruff ............... B60N 2/2893 |
| 10,166,893 B2 | * | 1/2019 | Takemoto ............... A47C 7/18 |
| 10,173,566 B2 | * | 1/2019 | Yonezawa ............... A47C 7/20 |
| 2009/0267401 A1 | * | 10/2009 | Ito ............... B60N 2/70 297/452.58 |
| 2013/0214583 A1 | | 8/2013 | Uramichi et al. |

FOREIGN PATENT DOCUMENTS

| | | |
|---|---|---|
| JP | 09-140956 A | 6/1997 |
| JP | 2004-174762 A | 6/2004 |
| JP | 2009-107131 A | 5/2009 |
| JP | 2013-198730 A | 10/2013 |
| JP | 2014-057634 A | 4/2014 |
| JP | 2014-128359 A | 7/2014 |
| JP | 2017-070629 A | 4/2017 |

OTHER PUBLICATIONS

International Search Report for PCT/JP2018/002221, dated Feb. 27, 2018.

* cited by examiner

MOLDED FOAM BODY

TECHNICAL FIELD

The present invention relates to a molded foam body.

This application is a National Stage of International Application No. PCT/JP2018/002221 filed Jan. 25, 2018, claiming priority based on Japanese Patent Application No. 2017-97437, filed May 16, 2017, the content of which is incorporated herein by reference.

BACKGROUND ART

Previously, a configuration in which a thigh rest part that is positioned on a front part and supports the thighs of an occupants and a hip rest part that extends rearward from a rear end part of the thigh rest part and supports the hips of the occupant are provided has become known as a molded foam body that has a seat surface on which the occupant is seated and is formed of a foam of a synthetic resin material. For a molded foam body of that type, for example, a configuration in which the entire upper part of a seat surface side is formed of a first synthetic resin material, both sides of the lower part on the side opposite to the seat surface in the left-right direction is formed of a second synthetic resin material that is harder than the first synthetic resin material, and a middle part between the sides in the left-right direction is formed of the first synthetic resin material and integrated with the upper part as disclosed in Patent Document 1 is known.

CITATION LIST

[Patent Document]
[Patent Document 1]
  Japanese Unexamined Patent Application, First Publication No. 2009-107131

SUMMARY OF INVENTION

Technical Problem

However, previously there has been a problem that it is difficult to mitigate rocking of an occupant when a lateral load or the like is applied thereto.

The invention takes the above circumstances into consideration, and an object of the present invention is to provide a molded foam body that can mitigate rocking of an occupant when a lateral load or the like is applied.

Solution to Problem

A molded foam body of the present invention is a molded foam body which has a seat surface on which an occupant is seated, is formed of a foam of a synthetic resin material, and has a thigh rest part that is positioned on a front part and supports thighs of the occupant, and a hip rest part that extends rearward from a rear end part of the thigh rest part and supports hips of the occupant, in which the molded foam body is formed of a first synthetic resin material and a second synthetic resin material that has higher hardness than the first synthetic resin material, an entire upper part on the seat surface side is formed of the first synthetic resin material, both sides of a lower part that are positioned opposite to the seat surface in a left-right direction are formed of the second synthetic resin material, and a middle part positioned between both sides in the left-right direction is formed of the first synthetic resin material and integrated with the upper part, a pair of left and right second synthetic resin materials forming the lower part have a rear part that is positioned in the hip rest part and a front part that is connected to a front end of the rear part and at least a front end part of which is positioned in the thigh rest part, with respect to a contour indicating an outer circumferential surface of a three-dimensional model, which is used in defining automobile seating accommodation (3DM-JM50) prescribed in the Japanese Industrial Standard JIS D4607-1977, generated when the model is placed on the seat surface in a plan view of the seat surface, the rear part extends inward in the left-right direction and the front part is positioned outside in the left-right direction, and in a plan view of the seat surface, a plane area of a part surrounded by an inner edge of the rear part in the left-right direction and the contour is larger than a plane area of a part sandwiched by an inner edge of the front part in the left-right direction and the contour in the left-right direction.

Effects of Invention

According to the invention, it is possible to mitigate rocking of an occupant when a lateral load or the like is applied.

DESCRIPTION OF EMBODIMENTS

Figure 1:
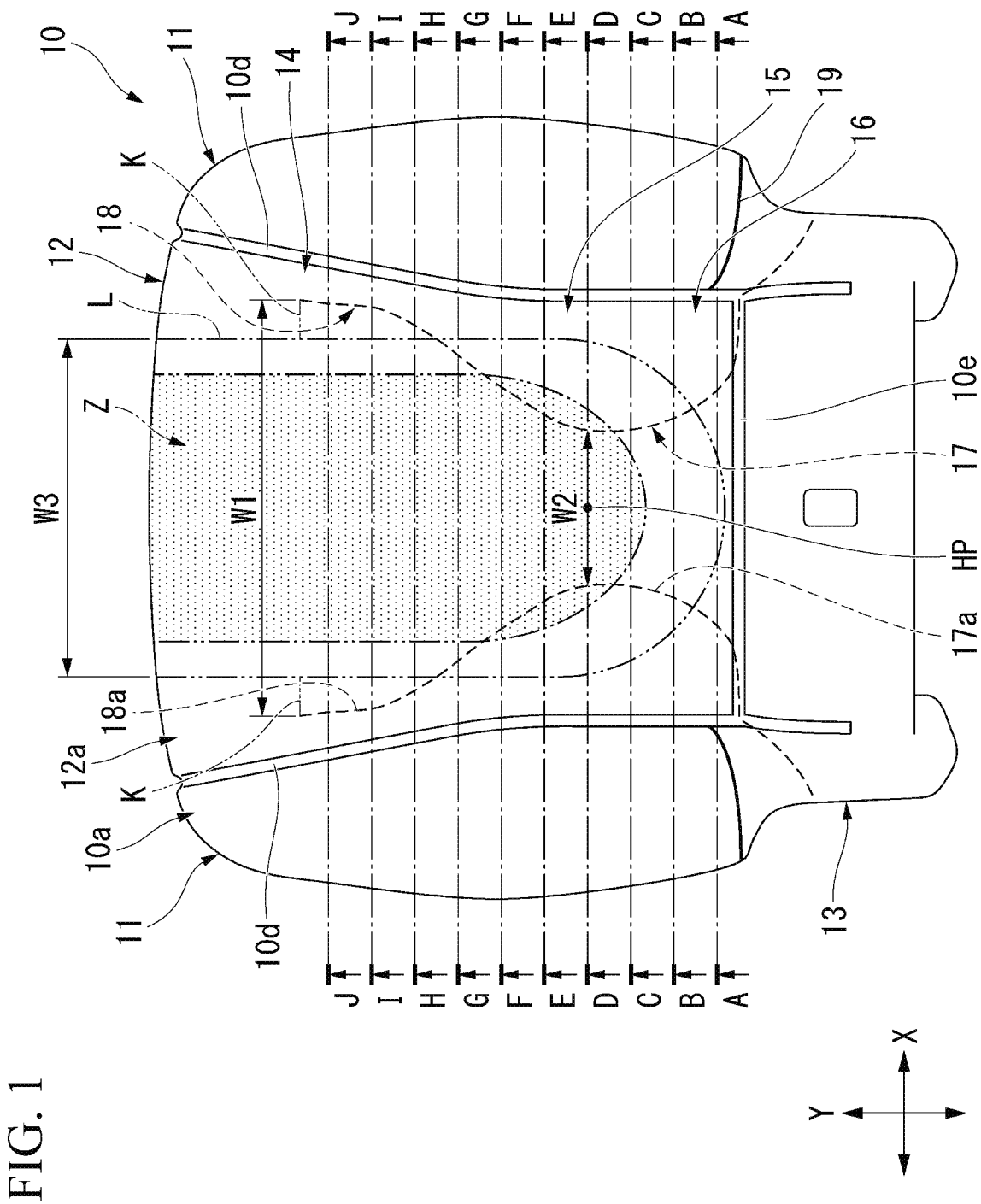
FIG. 1 is a top view of a molded foam body according to an embodiment of the present invention.
Figure 2A:
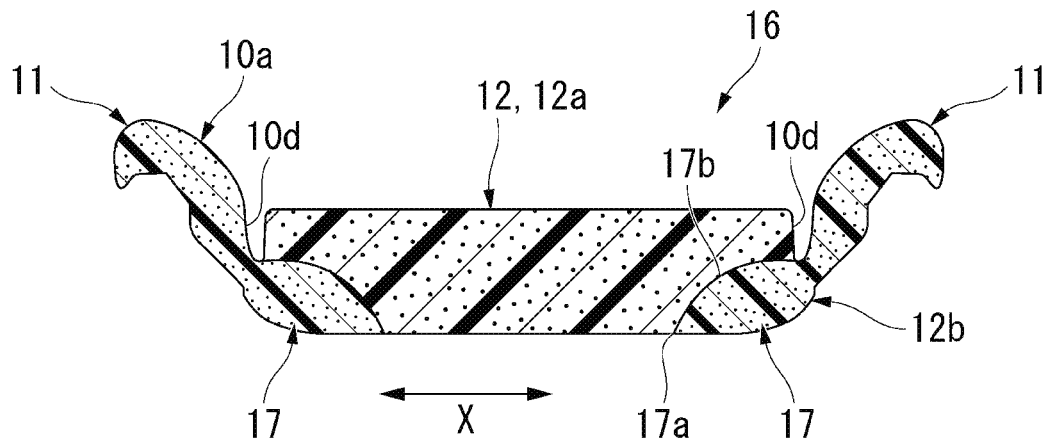
FIG. 2A is a line A-A cross-sectional view of the molded foam body shown in FIG. 1.
Figure 2B:
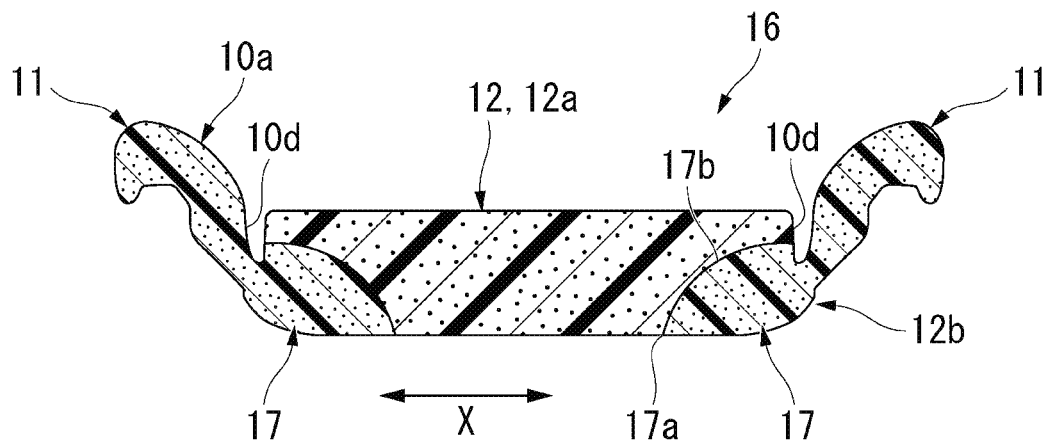
FIG. 2B is a line B-B cross-sectional view of the molded foam body shown in FIG. 1.
Figure 2C:
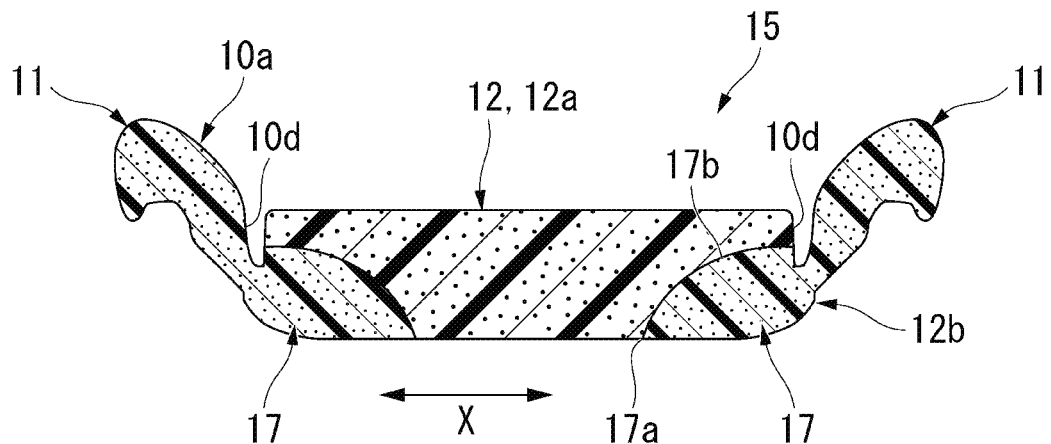
FIG. 2C is a line C-C cross-sectional view of the molded foam body shown in FIG. 1.
Figure 3A:
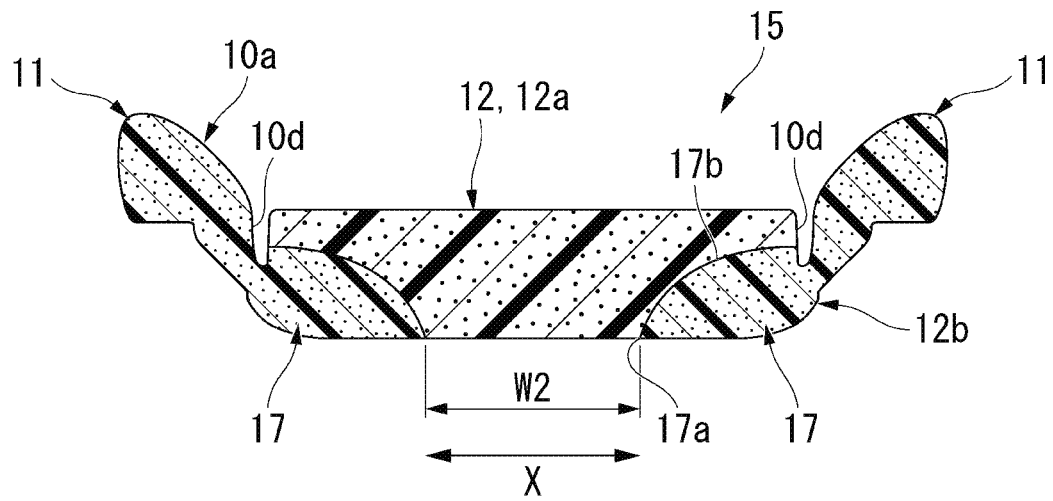
FIG. 3A is a line D-D cross-sectional view of the molded foam body shown in FIG. 1.
Figure 3B:
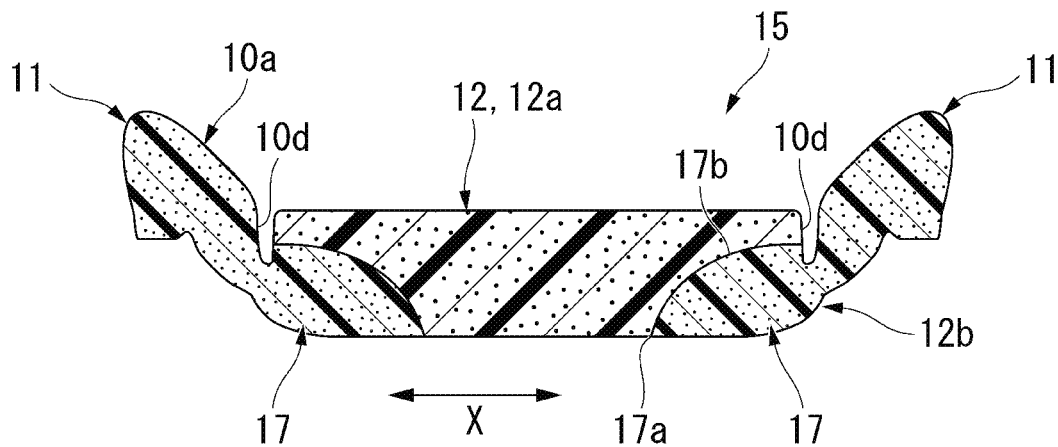
FIG. 3B is a line E-E cross-sectional view of the molded foam body shown in FIG. 1.
Figure 3C:
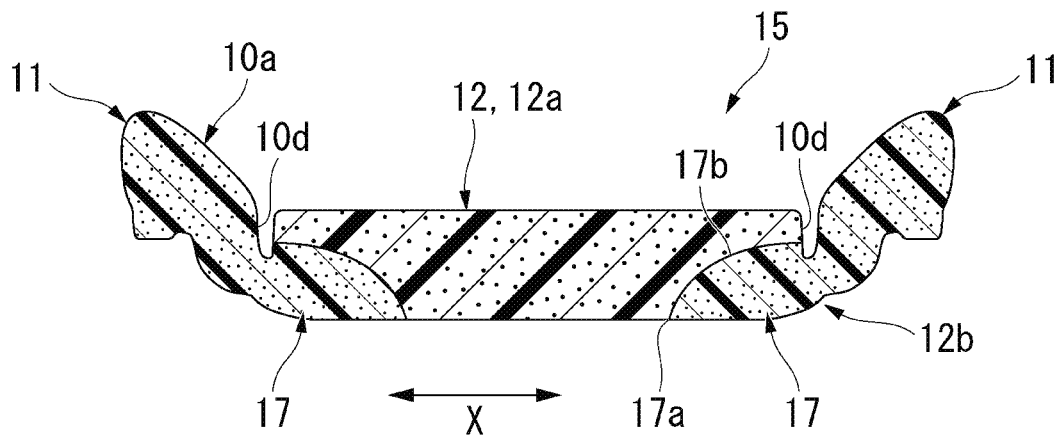
FIG. 3C is a line F-F cross-sectional view of the molded foam body shown in FIG. 1.
Figure 4A:
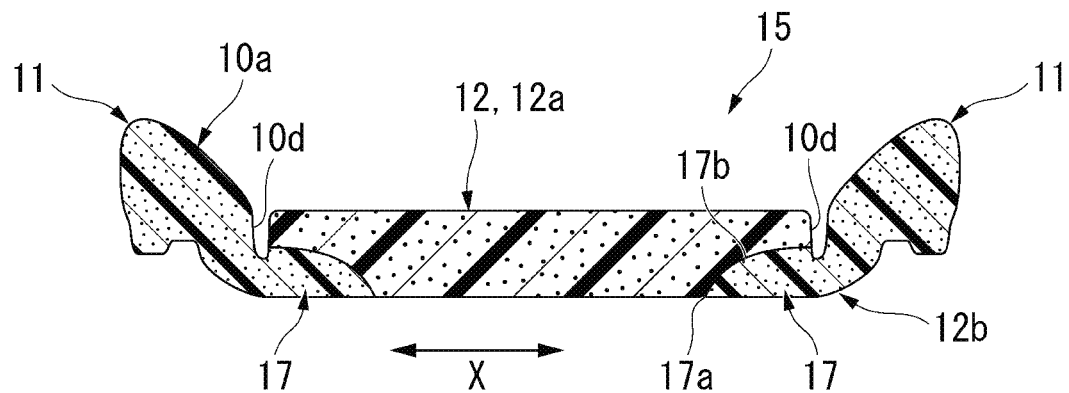
FIG. 4A is a line G-G cross-sectional view of the molded foam body shown in FIG. 1.
Figure 4B:
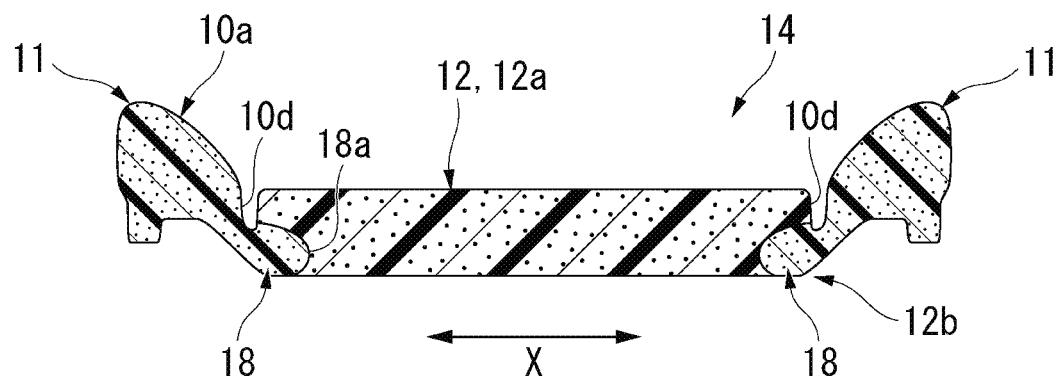
FIG. 4B is a line H-H cross-sectional view of the molded foam body shown in FIG. 1.
Figure 4C:
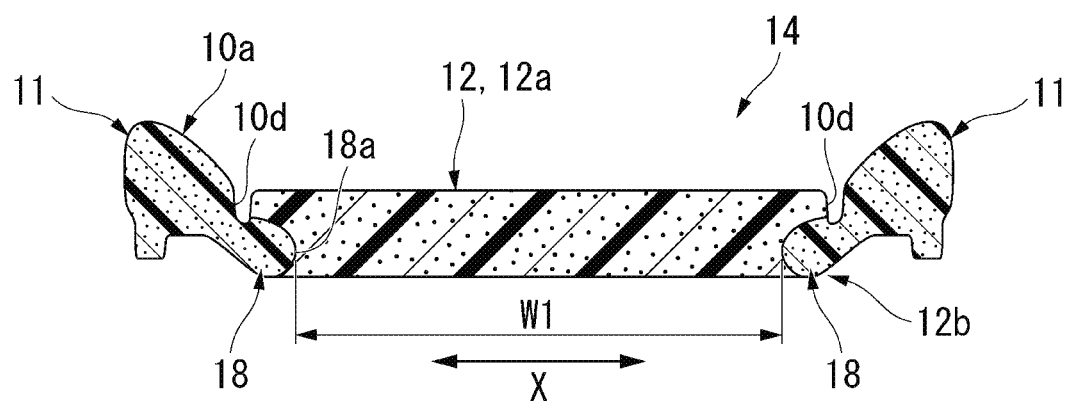
FIG. 4C is a line I-I cross-sectional view of the molded foam body shown in FIG. 1.
Figure 4D:
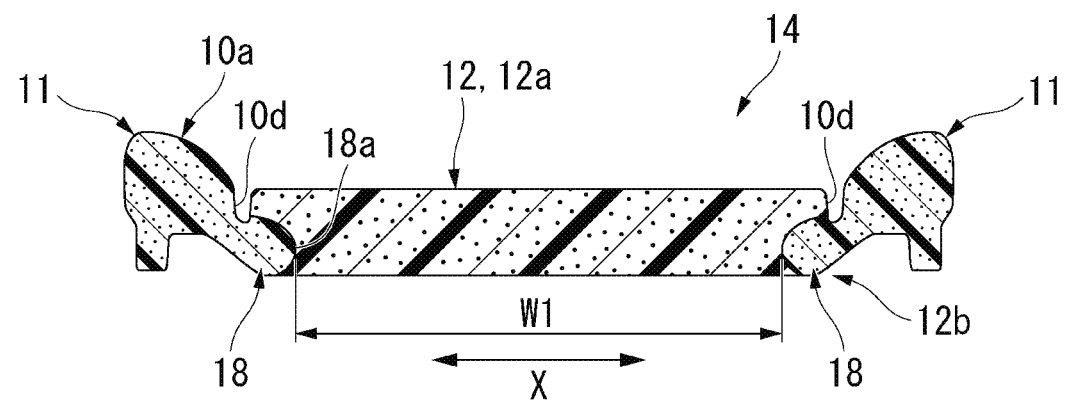
FIG. 4D is a line J-J cross-sectional view of the molded foam body shown in FIG. 1.

An embodiment of a molded foam body according to the present invention will be described below with reference to FIG. 1 to FIG. 5B.

A molded foam body 10 includes a body part 12 formed of a foam of a first synthetic resin material and a foam of a second synthetic resin material that is harder than the first synthetic resin material, a pair of left and right side parts 11 that are connected to both sides of the body part 12 in the left-right direction X and are formed of a foam of the second synthetic resin material, an attachment part 13 projecting rearward integrally from the body part 12 and the side parts 11, and a seat surface 10a on which an occupant is seated.

First boundary grooves 10d extending in a front-rear direction Y are separately formed on the seat surface 10a at the boundaries between the pair of the side parts 11 and the body part 12, and a second boundary groove 10e extending in the left-right direction X is formed at the boundary between the body part 12 and the attachment part 13. The first boundary grooves 10d and the second boundary groove 10e have fixtures attached to fix a covering sheet to the molded foam body 10. The attachment part 13 is disposed immediately below a lower end part of a backrest part, which is not shown.

The foam of the first synthetic resin material and the foam of the second synthetic resin material are obtained by foam-molding an undiluted foam solution containing a polyol, a polyisocyanate, for example, methylene diphenyl diisocyanate (MDI), or the like, a crosslinking agent, a foaming agent, and a catalyst. The hardness of the second synthetic resin material is, for example, 1.2 times or more and 3.5 times or less a hardness of the first synthetic resin material. The hardness of the first synthetic resin material is, for example, about 180 N to 500 N, and the hardness of the second synthetic resin material is, for example, about 200 N to 600 N.

Here, a method for measuring hardness will be described.

First, a pressure plate is moved forward to the molded foam body 10 at a speed of 50 mm/min until a reaction force that the pressure plate receives reaches 4.9 N, and the position of the pressure plate is set as an initial position where the thickness of the molded foam body 10 is 100%. The pressure plate is a circular plate having a diameter of 200 mm, and a receiving plate of the molded foam body 10 that supports the back surface positioned opposite to the seat surface 10a has through holes having a diameter of 6 mm which are formed at a pitch of 19 mm. The surface shape of the receiving plate is the same as the back surface shape of the molded foam body 10.

Next, the pressure plate positioned at the initial position is moved forward to the molded foam body 10 at a speed of 50 mm/min, and when the thickness of the molded foam body 10 is reduced to 75%, the pressure plate is quickly moved backward to a position at which the molded foam body 10 does not receive a reaction force. Then, after waiting for 60 seconds, the pressure plate is moved forward to the molded foam body 10 at the speed of 50 mm/min again and the pressure plate is stopped at a position where the thickness of the molded foam body 10 is reduced to 75%. Then, the reaction force that the pressure plate receives after waiting for 20 seconds is determined and the value is set as the hardness.

The body part 12 includes a thigh rest part 14 that is positioned on the front part and supports the thighs of an occupant, a hip rest part 15 that extends rearward from a rear end part of the thigh rest part 14 and supports the hips of the occupant, and a non-contact part 16 that connects a rear end part of the hip rest part 15 to the attachment part 13 as shown in FIG. 1.

Here, the non-contact part 16 is an inner part of the body part 12 with which an occupant does not come in contact when the occupant sits on the seat surface 10a since the waist of the occupant does not go deep into the rear end part of the body part 12 due to, for example, a backrest part, which is not shown. The non-contact part 16 is a part of the body part 12 with which, for example, a three-dimensional model, which is used in defining automobile seating accommodation (3DM-JM50) prescribed in the Japanese Industrial Standards JIS D4607-1977 (which will be referred to as a "model") and is set to weigh 50 kg, does not come in contact when the model is placed on the seat surface 10a.

Further, the hatched part on the seat surface 10a shown in FIG. 1 indicates a contact region Z of the seat surface 10a with which the model comes in contact when the model is placed on the seat surface 10a. The rear end part of the contact region Z has a curved shape projecting rearward in a plan view of the seat surface 10a. The non-contact part 16 is a part of the body part 12 positioned behind the contact region Z. A front edge of the non-contact part 16 is aligned with a line, which is not shown, passing through a rear edge of the contact region Z and extending in the left-right direction X. In a plan view of the seat surface 10a, the hip point HP of the model placed on the seat surface 10a, that is, a connection part of the trunk and the thighs (hip joint), is positioned in the contact region Z. Further, a front edge of the hip rest part 15 is positioned about 100 mm in front of the hip point HP.

As shown in FIG. 2A to FIG. 4D, an entire upper part 12a of the body part 12 on the seat surface 10a side is formed of the first synthetic resin material. Both sides of a lower part 12b of the body part 12 in the left-right direction X, which is positioned opposite to the seat surface 10a, is formed of the second synthetic resin material and integrated with the side parts 11, and a middle part positioned between both sides in the left-right direction X is formed of the first synthetic resin material and integrated with the upper part 12a. The first synthetic resin material forming the lower part 12b of the body part 12 and the second synthetic resin material adhere directly to each other without having an adhesive layer therebetween.

Here, a pair of left and right second synthetic resin materials forming the lower part 12b of the body part 12 includes a rear part 17 that is positioned in the hip rest part 15 and a front part 18 that is connected to a front end of the rear part 17 and at least a front end part of which is positioned in the thigh rest part 14 as shown in FIG. 1. With respect to a U-shaped referenced contour L indicating an outer circumferential surface of the model placed on the seat surface 10a, that is, a surface that is orthogonal to the top-bottom direction and directed in the horizontal direction including the left-right direction X and the front-rear direction Y in the plan view of the seat surface 10a as shown in FIG. 1, the rear part 17 extends inward in the left-right direction X, and the front part 18 is positioned outside in the left-right direction X.

An inner edge 17a of the rear part 17 in the left-right direction X has a curved shape projecting inward the left-right direction X in the plan view of the seat surface 10a. The front half part of the rear part 17 is positioned in the hip rest part 15 and the rear half part thereof is positioned in the non-contact part 16. In the example shown, the entire rear part 17 except for the rear end part thereof projects inward from the contour L in left-right direction X. A front edge of the rear part 17 is positioned on the front edge of the hip rest part 15 on the contour L. Further, the front edge of the rear part 17 may be set to be positioned in the thigh rest part 14 or behind the front edge of the hip rest part 15.

A part of the rear part 17 crosses, in the front-rear direction Y, the position at which the hip point HP is positioned in the front-rear direction Y (which will be referred to as an HP position) and overlaps a part of the contact region Z that is positioned in the hip rest part 15 in the plan view of the seat surface 10a. In the example shown, the part of the rear part 17 is an inner end part of the front half part of the rear part 17 in the left-right direction X.

The entire front part 18 is positioned outside the contour L in the left-right direction X. The front end part of the front part 18 is positioned in the thigh rest part 14 and the part behind the front end part is positioned in the hip rest part 15. In the example shown, the front half part of the front part 18 is positioned in the thigh rest part 14, and the rear half part thereof is positioned in the hip rest part 15. Further, the thigh rest part 14 starts from a part about 150 mm in front of the HP position and ends at a part about 250 mm in front of the HP position in the body part 12. An inner edge 18a of the front part 18 in the left-right direction X gradually extends outward in the left-right direction X from the rear side to the front side. The inner edge 18a of the front part 18 in the left-right direction X has a curved shape that is recessed outward in the left-right direction X in the plan view of the seat surface 10a.

In addition, in the plan view of the seat surface 10a, the plane area of the part surrounded by the inner edge 17a of the rear part 17 in the left-right direction X and the contour L is larger than the plane area of the part sandwiched by the inner edge 18a of the front part 18 in the left-right direction X and the contour L in the left-right direction X. Further, an auxiliary line K connecting the front edge of the front part 18 and the contour L in the left-right direction X is given in FIG. 1, and in this case, the latter plane area refers to the plane area surrounded by the auxiliary line K, the inner edge 18a of the front part 18 in the left-right direction X, and the contour L.

Each of the plane areas is larger than the plane area of the overlapping part of the rear part 17 and the contact region Z in the plan view of the seat surface 10a.

A part of the pair of left and right second synthetic resin materials forming the lower part 12b of the body part 12 having a maximum gap therebetween in the left-right direction X is positioned in the thigh rest part 14, and a part thereof having a minimum gap is positioned in the hip rest part 15. In the example shown, the gap between the pair of left and right second synthetic resin materials forming the lower part 12b of the body part 12 in the left-right direction X becomes a maximum at the front end part of the front part 18 and becomes a minimum at the HP position. The maximum value W1 of the gap between the pair of left and right second synthetic resin materials forming the lower part 12b of the body part 12 in the left-right direction X is two times or more and three times or less the minimum value W2 of the gap in the left-right direction X.

Here, a length W3 of the contour L in the left-right direction X is shorter than the maximum value W1 and longer than the minimum value W2.

The gap between the pair of left and right second synthetic resin materials forming the lower part 12b of the body part 12 in the left-right direction X smoothly changes rearward from the front end part of the front part 18 without a step. In the example shown, the gap between the pair of left and right second synthetic resin materials forming the lower part 12b of the body part 12 in the left-right direction X gradually decreases from the front end part of the front part 18 at which the gap becomes a maximum toward the HP position at which the gap becomes a minimum. Further, parts at which the gap between the pair of left and right second synthetic resin materials forming the lower part 12b of the body part 12 in the left-right direction X becomes a maximum or minimum are not limited to the front end part of the front part 18 and the HP position, and may be appropriately changed.

Here, the gap between the pair of left and right second synthetic resin materials forming the lower part 12b of the body part 12 in the left-right direction X is, for example, about 110 mm (the minimum value W2) at the HP position (FIG. 3A), about 120 mm at the position about 30 mm behind the HP position (FIG. 2C), about 140 mm at the position about 60 mm behind the HP position (FIG. 2B), about 150 mm at the position about 90 mm behind the HP position (FIG. 2A), about 120 mm at the position about 30 mm in front of the HP position (FIG. 3B), about 140 mm at the position about 60 mm in front of the HP position (FIG. 3C), about 180 mm at the position about 90 mm in front of the HP position (FIG. 4A), about 250 mm at the position about 120 mm in front of the HP position (FIG. 4B), about 280 mm at the position about 150 mm in front of the HP position (FIG. 4C), about 280 mm at the position about 180 mm in front of the HP position (FIG. 4D), and about 290 mm (the maximum value W1) at the position about 200 mm in front of the HP position.

Out of the second synthetic resin materials forming the lower part 12b of the body part 12, at least the size of the rear part 17 in the top-bottom direction gradually decreases from the outer side to the inner side in the left-right direction X, and each of boundary surfaces 17b between the second synthetic resin materials and the first synthetic resin material is formed in a curved shape projecting inward in the left-right direction X.

Further, a front end part among both end parts of the attachment part 13 in the left-right direction X positioned at the lower part that is positioned opposite to the seat surface 10a is formed of the second synthetic resin material, and all other parts except this part are formed of the first synthetic resin material. The embodiment is not limited thereto, and for example, the front end part among both end parts at the lower part of the attachment part 13 in the left-right direction X may be formed of the first synthetic resin material, all other parts except this part may be formed of the second synthetic resin material, and the attachment part 13 may be formed of another resin material other than the first synthetic resin material and the second synthetic resin material.

As shown in FIG. 1, horizontal grooves 19 extending in the left-right direction X are formed in parts of the side parts 11 adjacent to the non-contact part 16 of the body part 12 in the left-right direction X. A width of the horizontal grooves 19 is narrower than the width of each of the first boundary grooves 10d and the second boundary groove 10e. The horizontal grooves 19 open on the seat surface 10a. The depth of the horizontal grooves 19 is deeper than the depth of each of the first boundary grooves 10d and the second boundary groove 10e. The horizontal grooves 19 penetrate the side parts 11 in the left-right direction X and open to the first boundary grooves 10d and sides of the surfaces of the side parts 11 facing outward in the left-right direction X.

Next, the foam molding mold 20 for molding the molded foam body 10 configured as described above will be described.

Figure 5A:
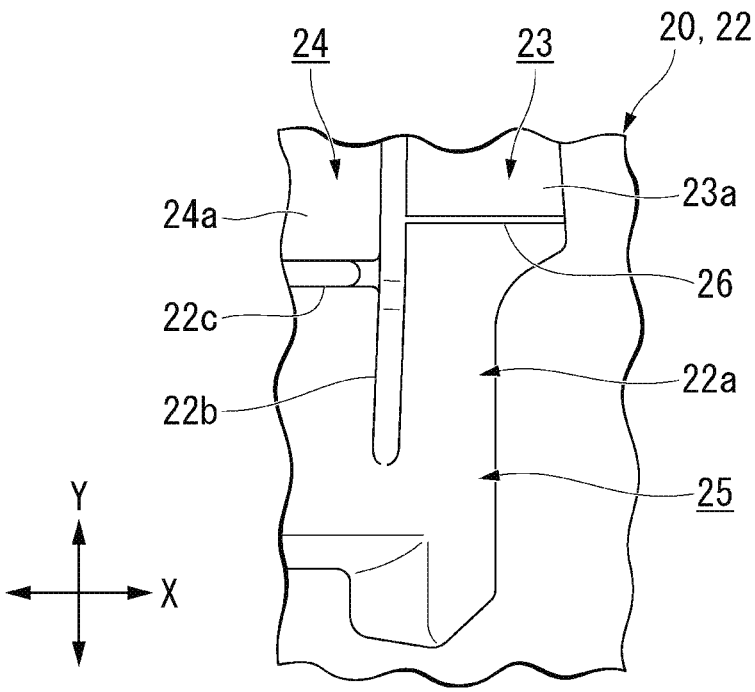
FIG. 5A is a top view of a part of a lower mold of a foam molding mold in which the molded foam body shown in FIG. 1 to FIG. 4D is molded.
Figure 5B:
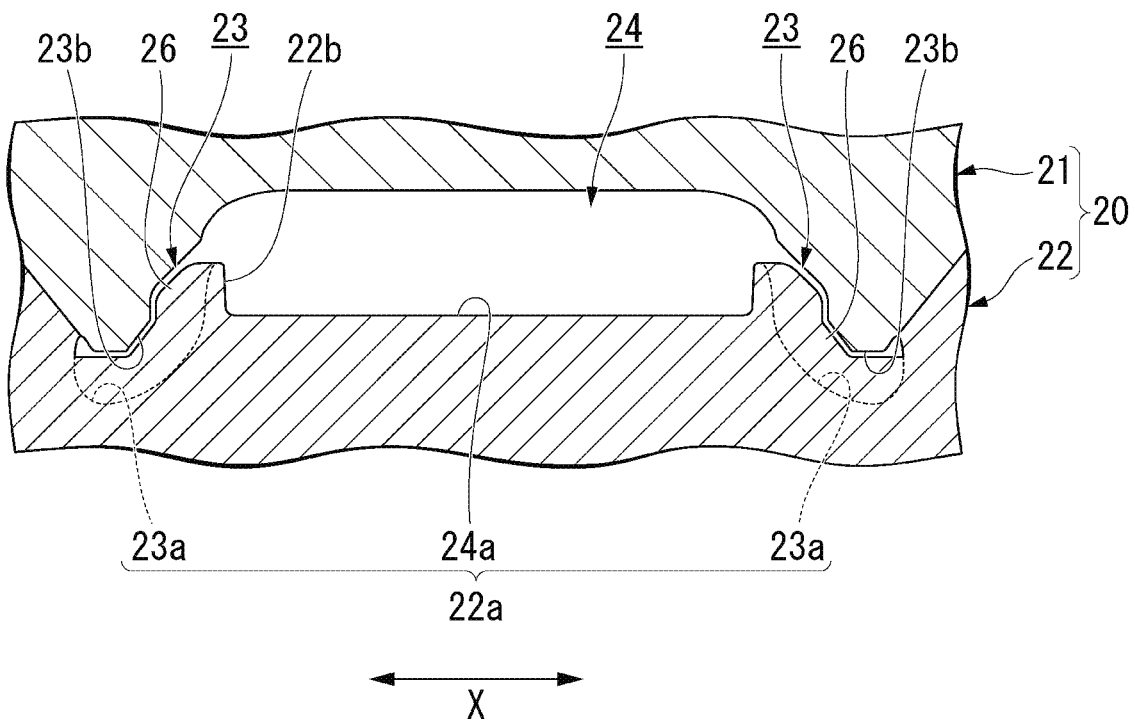
FIG. 5B is a vertical sectional view of the foam molding mold in which the molded foam body shown in FIG. 1 to FIG. 4D is molded in both the top-bottom direction and the left-right direction.

The foam molding mold 20 has an upper mold (molding mold) 21 and a lower mold (molding mold) 22, and a pair of left and right side part cavities 23 in which the side parts 11 are molded, a body part cavity 24 in which the body part 12 is molded, and an attachment part cavity 25 in which the attachment part 13 is molded are formed between the upper mold 21 and the lower mold 22 as shown in FIG. 5A and FIG. 5B. The surface among inner surfaces of the lower mold 22 that faces upward is a supply surface 22a to which an undiluted foam solution of the first synthetic resin material and an undiluted foam solution of the second synthetic resin material are supplied to mold the seat surface 10a. The supply surface 22a includes side-part supply surfaces 23a that define a part of inner surfaces of the side part cavities 23 to which the undiluted foam solution of the second synthetic resin material is supplied and a body-part supply surface 24a that defines a part of inner surfaces of the body part cavity 24 to which the undiluted foam solution of the first synthetic resin material is supplied.

In the side part cavities 23, guiding parts 26 that guide a foam to the body part cavity 24 when the undiluted foam solution of the second synthetic resin material supplied to the side part cavities 23 foams are disposed at the parts adjacent to, in the left-right direction X, a rear end part of the body part cavity 24 in which the non-contact part 16 is molded. The guiding parts 26 are provided on the side-part supply surfaces 23a in a standing manner.

In the example shown, the guiding parts 26 are formed of, for example, an aluminum alloy or the like and integrated with the lower mold 22. The guiding parts 26 are formed in a plate shape whose front and rear surfaces face the front-rear direction Y. The guiding parts 26 extend in the entire length of the side part cavities 23 in the left-right direction X. An amount of each guiding part 26 projecting from the side-part supply surfaces 23a is 50% or more and 90% or less of the gap between an opposite surface 23b facing the side-part supply surface 23a and the side-part supply surface 23a among inner surfaces defining the side part cavities 23. An upper edge of each guiding part 26 extends in the left-right direction X along the opposite surface 23b. The thickness of each guiding part 26 is, for example, about 3 mm or more and 5 mm or less. Accordingly, a width of the molded horizontal grooves 19 is restricted, and it is difficult for the horizontal grooves 19 to be able to be visually recognized from outside.

The guiding parts 26 are, for example, 10 mm or more and 20 mm or less in front of the boundary between the side part cavities 23 and the body part cavity 24, and the attachment part cavity 25. In the example shown, a second boundary rib 22c for molding the second boundary groove 10e is disposed on the boundary of the body part cavity 24 and the attachment part cavity 25. The guiding parts 26 are 10 mm or more and 20 mm or less in front of the second boundary rib 22c.

Here, first boundary ribs 22b for molding the first boundary grooves 10d are disposed on the boundaries of the side part cavities 23 and the body part cavity 24. The first boundary ribs 22b and the second boundary rib 22c are provided on the supply surface 22a in a standing manner. The guiding parts 26 extend outward from the first boundary ribs 22b in the left-right direction X. Upper edges of the inner end parts of the guiding parts 26 in the left-right direction X are connected to upper edges of the first boundary ribs 22b without a step.

Next, a method for molding the molded foam body 10 using the foam molding mold 20 configured as described above will be described.

First, in a mold-open state in which the supply surface 22a of the lower mold 22 is opened by separating the upper mold 21 from the lower mold 22, the undiluted foam solution of the second synthetic resin material is supplied to the side-part supply surfaces 23a, and the undiluted foam solution of the first synthetic resin material is supplied to the body-part supply surface 24a (supply step). At this moment, the undiluted foam solution of the second synthetic resin material is supplied to parts of the side part cavities 23 positioned in front of the guiding parts 26. Then, the supply surface 22a of the lower mold 22 is sealed with the upper mold 21, and each of the undiluted foam solutions are caused to foam in a mold-clamped state in which the side part cavities 23, the body part cavity 24, and the attachment part cavity 25 are defined between the upper mold 21 and the lower mold 22 (foaming step). Here, the undiluted foam solution of the second synthetic resin material reaches the guiding parts 26 in the course of foaming in the side part cavities 23, and the foam is guided inward in the left-right direction X by the guiding parts 26 and enters the body part cavity 24 inward in the left-right direction X.

Further, for the supply step, the timing at which the undiluted foam solution of the second synthetic resin material is supplied to the side-part supply surfaces 23a and the timing at which the undiluted foam solution of the first synthetic resin material is supplied to the body-part supply surface 24a may be the same or different, and can be appropriately set according to, for example, a foaming speed, a volume, or the like of each of the undiluted foam solutions. In addition, molding may be performed by supplying the second synthetic resin material to the side-part supply surfaces 23a and then injecting the first synthetic resin material to the body-part supply surface 24a without providing the guiding parts 26.

According to the molded foam body 10 of the present embodiment, since the plane area of the part surrounded by the inner edge 17a of the rear part 17 in the left-right direction X positioned in the hip rest part 15 and the contour L is greater than the plane area of the part sandwiched by the inner edge 18a of the front part 18 in the left-right direction X and the contour L in the left-right direction X in the plane view of the seat surface 10a as described above, a larger amount of the hard second synthetic resin material is disposed on both sides of a part of the lower part 12b of the body part 12 in the left-right direction X positioned in the hip rest part 15 to which a large load is applied.

Furthermore, in the present embodiment, since the part of the pair of left and right second synthetic resin materials forming the lower part 12b of the body part 12 at which the gap in the left-right direction X becomes a minimum is positioned in the hip rest part 15 and the maximum value W1 of the gap in the left-right direction X is two times or more the minimum value W2 of the gap in the left-right direction X, a large amount of the hard second synthetic resin material is disposed on both sides of a part of the lower part 12b of the body part 12 in the left-right direction X positioned in the hip rest part 15 to which a large load is applied.

With the above configuration, the hips of the occupant can be reliably held by both sides of the pair of left and right second synthetic resin materials forming the lower part 12b of the body part 12 in the left-right direction X, a difference between degrees of thighs and hip sinking into the molded foam body can be reduced, and thus rocking of the occupant when a lateral load or the like is applied can be mitigated.

In addition, since the entire upper part 12a of the body part 12 that comes in contact with the occupant is formed of the soft first synthetic resin material, satisfactory ride comfort can be exhibited.

In addition, since the maximum value W1 of the gap between the pair of left and right second synthetic resin materials forming the lower part 12b of the body part 12 in the left-right direction X is three times or less the minimum value W2 of the gap in the left-right direction X, rocking of the occupant when a lateral load or the like is applied can be more reliably mitigated.

In addition, since the gap between the pair of left and right second synthetic resin materials forming the lower part 12b of the body part 12 in the left-right direction X smoothly changes rearward from the front end part of the lower part without a step, it is possible to prevent the generation of a part whose hardness in the top-bottom direction abruptly changes in the front-rear direction Y, and thus discomfort felt by the occupant when he or she is seated can be mitigated.

In addition, since the hardness of the second synthetic resin material is 1.2 times or more and 3.5 times or less that of the first synthetic resin material, the hips of the occupant can be reliably held by both sides of the pair of left and right second synthetic resin materials forming the lower part 12b of the body part 12 in the left-right direction X.

In addition, since the horizontal grooves 19 extending in the left-right direction X are formed on the parts of the side parts 11 adjacent to the non-contact part 16 of the body part 12 in the left-right direction X, the side parts 11 are easily displaced inward in the left-right direction X through substantially the entire region in the front-rear direction Y following the downward deflection deformation of the body part 12 when the occupant is seated on the seat surface 10a, and the hips of the occupant can be easily held by the side parts 11 on both sides in the left-right direction X. Moreover, since the horizontal grooves 19 are formed in the parts that are hard to visually recognize in the side parts 11 and are adjacent to the non-contact part 16 in the left-right direction X, an unattractive appearance attributable to the formation of the horizontal grooves 19 can be prevented.

Further, the technical scope of the present invention is not limited to the above-described embodiment and can be variously modified within a scope not departing from the gist of the present invention.

For example, although the molded foam body 10 having the side parts 11 and the attachment part 13 has been introduced in the above-described embodiment, the present invention can also be applied to a molded foam body not having the side parts 11 and the attachment part 13.

In addition, although the configuration in which the plane area surrounded by the inner edge 17a of the rear part 17 in the left-right direction X and the contour L is larger than the plane area sandwiched by the inner edge 18a of the front part 18 in the left-right direction X and the contour L in the left-right direction X in the plan view of the seat surface 10a has been introduced in the above-described embodiment, the configuration may be employed if the part of the pair of left and right second synthetic resin materials forming the lower part 12b of the body part 12 at which the gap in the left-right direction X becomes a minimum is positioned in the hip rest part 15 and the maximum value W1 of the gap in the left-right direction X is two times or more the minimum value W2 of the gap in the left-right direction X.

In addition, although the configuration in which the part of the pair of left and right second synthetic resin materials forming the lower part 12b of the body part 12 at which the gap in the left-right direction X becomes a minimum is positioned in the hip rest part 15 and the maximum value W1 of the gap in the left-right direction X is two times or more the minimum value W2 of the gap in the left-right direction X has been introduced in the above-described embodiment, the configuration may be applied if the plane area surrounded by the inner edge 17a of the rear part 17 in the left-right direction X and the contour L is larger than the plane area sandwiched by the inner edge 18a of the front part 18 in the left-right direction X and the contour L in the left-right direction X in the plan view of the seat surface 10a.

In addition, the constituent components of the above-described embodiment can be appropriately replaced by known constituent components in a scope not departing from the gist of the present invention, and the above-described modified examples may be appropriately combined.

Next, a verification test of the above-described effects will be described.

As Example, the molded foam body 10 shown in FIG. 1 to FIG. 4B was employed, and as a conventional example, a molded foam body that was formed of the same material as in the example having an the inner edge of the rear part positioned in the hip rest part in the left-right direction substantially extending in the front-rear direction along the contour L (FIG. 1) in a plan view of the seat surface was employed.

In addition, in each of Example and a comparative example, the above-described model set to weigh 50 kg was placed on the seat surface for 10 minutes and the sinking degree of the seat surface was measured. The sinking degree was measured at two spots including a position about 140 mm behind the HP position (which will be referred to as a hip-side position) and a position about 300 mm in front of the HP position (which will be referred to as a thigh-side position).

As a result, while the degree was 4.13 mm at the hip-side position and 0.68 mm at the thigh-side position in the conventional example, the degree was 3.11 mm at the hip-side position and 2.00 mm at the thigh-side position in Example. That is, while the difference between the sinking degrees at the hip-side position and the thigh-side position was 3.45 mm in the conventional example, the difference was 1.11 mm in Example, and therefore it is ascertained that the difference between the sinking degree of the thighs and the sinking degree of the hip can be reduced.

According to the present invention, since the plane area surrounded by the inner edge of the rear part positioned in the hip rest part in the left-right direction and the contour is larger than the plane area sandwiched by the inner edge of the front part in the left-right direction and the contour in the left-right direction in the plan view of the seat surface, a large amount of the hard second synthetic resin material is disposed on both sides of a part of the lower part of the molded foam body in the left-right direction positioned in the hip rest part to which a large load is applied. Thus, the hips of the occupant can be reliably held by the second synthetic resin material in the left-right direction, a difference between degrees of thighs and hip sinking into the molded foam body can be reduced, and thus rocking of the occupant when a lateral load or the like is applied can be mitigated. In addition, since the entire upper part of the molded foam body that comes in contact with the occupant is formed of the soft first synthetic resin material, satisfactory ride comfort can be exhibited.

In addition, the molded foam body of the present invention is a molded foam body which has a seat surface on which an occupant is seated and is formed of a foam of synthetic resin materials, has a thigh rest part that is positioned on the front part and supports the thighs of the occupant and a hip rest that extends rearward from the rear end part of the thigh rest part and supports the hips of the occupant, is formed of a first synthetic resin material and a second synthetic resin material that is harder than the first synthetic resin material, in which the entire upper part thereof on the seat surface side is formed of the first synthetic resin material, both sides of the lower part that is positioned opposite to the seat surface in the left-right direction is formed of the second synthetic resin material, the middle part positioned between both sides in the left-right direction is formed of the first synthetic resin material and integrated with the upper part, the part of the pair of left and right second synthetic resin materials forming the lower part having the maximum gap therebetween in the left-right direction is positioned in the thigh rest part, the part thereof having a minimum gap is positioned in the hip rest part, and the maximum value of the gap between the pair of left and right second synthetic resin materials forming the lower part in the left-right direction is two times or more the minimum value of the gap in the left-right direction.

According to the present invention, since the part of the pair of left and right second synthetic resin materials forming the lower part of the molded foam body having the minimum gap in the left-right direction is positioned in the hip rest part and the part thereof having a maximum gap therebetween in the left-right direction is two times or more the minimum value of the gap in the left-right direction, a large amount of the hard second synthetic resin material is disposed on both sides of a part of the lower part of the molded foam body in the left-right direction positioned in the hip rest part to which a large load is applied. Therefore, the hips of the occupant can be reliably held by both sides of the pair of left and right second synthetic resin materials in the left-right direction, a difference between degrees of thighs and hip sinking into the molded foam body can be reduced, and thus rocking of the occupant when a lateral load or the like is applied can be mitigated.

In addition, since the entire upper part of the molded foam body that comes in contact with the occupant is formed of the soft first synthetic resin material, satisfactory ride comfort can be exhibited.

In addition, the part of the pair of left and right second synthetic resin materials forming the lower part having the maximum gap therebetween in the left-right direction may be positioned in the thigh rest part, the part thereof having a minimum gap may be positioned in the hip rest part, and the maximum value of the gap between the pair of left and right second synthetic resin materials forming the lower part in the left-right direction may be two times or more the minimum value of the gap in the left-right direction.

In this case, rocking of the occupant when a lateral load or the like is applied can be reliably mitigated.

In addition, the maximum value of the gap between the pair of left and right second synthetic resin materials forming the lower part in the left-right direction may be three times or less the minimum value of the gap in the left-right direction.

In this case, rocking of the occupant when a lateral load or the like is applied can be reliably mitigated.

In addition, the gap between the pair of left and right second synthetic resin materials forming the lower part in the left-right direction may smoothly change rearward from the front end part of the lower part without a step.

In this case, since the gap between the pair of left and right second synthetic resin materials forming the lower part of the molded foam body in the left-right direction smoothly change rearward from the front end part of the lower part without a step, it is possible to prevent the generation of a part whose hardness in the top-bottom direction abruptly changes in the front-rear direction, and thus discomfort felt by the occupant when he or she is seated can be mitigated.

The hardness of the second synthetic resin material may be 1.2 times or more and 3.5 times or less a hardness of the first synthetic resin material.

In this case, since the hardness of the second synthetic resin material is 1.2 times or more and 3.5 times or less hardness of the first synthetic resin material, the hips of the occupant can be reliably held by both sides of the pair of left and right second synthetic resin materials forming the lower part of the molded foam body in the left-right direction.

The body part having the thigh rest part and the hip rest part, the pair of left and right side parts that are connected to the body part on both sides in the left-right direction and are formed of a foam of the second synthetic resin material, the attachment part that projects rearward integrally from the body part and the side parts are provided, the body part has a non-contact part that connects the rear end part of the hip rest part and the attachment part, and the horizontal grooves extending in the left-right direction may be formed in the parts of the side parts adjacent to the non-contact part in the left-right direction.

In this case, since the horizontal grooves extending in the left-right direction are formed in the parts of the side parts adjacent to the non-contact part of the body part in the left-right direction, the side parts are easily displaced inward in the left-right direction through substantially the entire region in the front-rear direction following the downward deflection deformation of the body part when the occupant is seated on the seat surface, and the hips of the occupant can be easily held by the side parts on both sides in the left-right direction. Moreover, since the horizontal grooves are formed in the parts that are hard to visually recognize in the side parts and adjacent to the non-contact part in the left-right direction, an unattractive appearance attributable to the formation of the horizontal grooves can be prevented.

INDUSTRIAL APPLICABILITY

According to the present invention, rocking of an occupant when a lateral load or the like is applied can be mitigated.

REFERENCE SIGNS LIST

10 Molded foam body
10*a* Seat surface
11 Side part
12 Body part
12*a* Upper part
12*b* Lower part
13 Attachment part
14 Thigh rest part
15 Hip rest part
16 Non-contact part
17 Rear part
17*a* Inner edge of rear part
18 Front part
18*a* Inner edge of front part
19 Horizontal groove
L Contour
X Left-right direction
Y Front-rear direction
W1 Maximum value
W2 Minimum value

What is claimed is:

1. A molded foam body which has a seat surface on which an occupant is seated and is formed of a foam of a synthetic resin material, comprising: a thigh rest part that is positioned on a front part and supports thighs of the occupant; and a hip rest part that extends rearward from a rear end part of the thigh rest part and supports hips of the occupant, wherein the molded foam body is formed of a first synthetic resin material and a second synthetic resin material that has higher hardness than the first synthetic resin material, wherein an entire upper part on the seat surface side is formed of the first synthetic resin material, wherein both sides of a lower part that is positioned opposite to the seat surface in a left-right direction are formed of the second synthetic resin material, and a middle part positioned between both sides in the left-right direction is formed of the first synthetic resin material and integrated with the upper part, wherein a pair of left and right second synthetic resin materials forming the lower part have a rear part that is positioned in the hip rest part and a front part that is connected to a front end of the rear part and at least a front end part of which is positioned in the thigh rest part, wherein, with respect to a U-shaped referenced contour line in a plane view of the seat surface, the rear part extends inward in the left-right direction with respect to the contour line and the front part is positioned outside in the left-right direction with respect to the contour line, and wherein, in a plan view of the seat surface, a plane area of a part surrounded by an inner edge of the rear part in the left-right direction and the contour line is larger than a plane area of a part sandwiched by an inner edge of the front part in the left-right direction and the contour line in the left-right direction.

2. The molded foam body according to claim 1,
wherein a part of the pair of left and right second synthetic resin materials forming the lower part having a maximum gap in the left-right direction is positioned in the thigh rest part, and a part having a minimum gap is positioned in the hip rest part, and
wherein a maximum value of the gap between the pair of left and right second synthetic resin materials forming the lower part in the left-right direction is two times or more a minimum value of the gap in the left-right direction.

3. The molded foam body according to claim 1,
wherein the gap between the pair of left and right second synthetic resin materials forming the lower part in the left-right direction smoothly changes rearward from a front end part of the lower part without a step.

4. The molded foam body according to claim 1,
wherein a hardness of the second synthetic resin material is 1.2 times or more and 3.5 times or less a hardness of the first synthetic resin material.

5. The molded foam body according to claim 1, comprising:
a body part having the thigh rest part and the hip rest part;
a pair of left and right side parts that are connected to the body part on both sides in the left-right direction and are formed of a foam of the second synthetic resin material; and
an attachment part that projects rearward integrally from the body part and the side parts,
wherein the body part has a non-contact part that connects a rear end part of the hip rest part and the attachment part, and
wherein lateral grooves extending in the left-right direction are formed in parts of the side parts adjacent to the non-contact part in the left-right direction.

6. The molded foam body according to claim 2,
wherein the maximum value of the gap between the pair of left and right second synthetic resin materials forming the lower part in the left-right direction is three times or less the minimum value of the gap in the left-right direction.

7. The molded foam body according to claim 2,
wherein the gap between the pair of left and right second synthetic resin materials forming the lower part in the left-right direction smoothly changes rearward from a front end part of the lower part without a step.

8. The molded foam body according to claim 6,
wherein the gap between the pair of left and right second synthetic resin materials forming the lower part in the left-right direction smoothly changes rearward from a front end part of the lower part without a step.

9. The molded foam body according to claim 2,
wherein a hardness of the second synthetic resin material is 1.2 times or more and 3.5 times or less a hardness of the first synthetic resin material.

10. The molded foam body according to claim 3,
wherein a hardness of the second synthetic resin material is 1.2 times or more and 3.5 times or less a hardness of the first synthetic resin material.

11. The molded foam body according to claim 6,
wherein a hardness of the second synthetic resin material is 1.2 times or more and 3.5 times or less a hardness of the first synthetic resin material.

12. The molded foam body according to claim 2, comprising:
a body part having the thigh rest part and the hip rest part;
a pair of left and right side parts that are connected to the body part on both sides in the left-right direction and are formed of a foam of the second synthetic resin material; and
an attachment part that projects rearward integrally from the body part and the side parts,
wherein the body part has a non-contact part that connects a rear end part of the hip rest part and the attachment part, and
wherein lateral grooves extending in the left-right direction are formed in parts of the side parts adjacent to the non-contact part in the left-right direction.

13. A molded foam body which has a seat surface on which an occupant is seated and is formed of a foam synthetic resin material, comprising:
a thigh rest part that is positioned on a front part and supports thighs of the occupant; and
a hip rest part that extends rearward from a rear end part of the thigh rest part and supports hips of the occupant,
wherein the molded foam body is formed of a first synthetic resin material and a second synthetic resin material that is harder than the first synthetic resin material,
wherein an entire upper part on the seat surface side is formed of the first synthetic resin material,
wherein both sides of a lower part that is positioned opposite to the seat surface in a left-right direction are formed of the second synthetic resin material, and a middle part positioned between both sides in the left-right direction is formed of the first synthetic resin material and integrated with the upper part,
wherein a part of a pair of left and right second synthetic resin materials forming the lower part having a maximum gap in the left-right direction is positioned in the thigh rest part and a part of the pair of left and right second synthetic resin materials having a minimum gap in the left-right direction is positioned in the hip rest part, and
wherein a maximum value of a gap between the pair of left and right second synthetic resin materials forming the lower part in the left-right direction is two times or more a minimum value of the gap in the left-right direction.

14. The molded foam body according to claim 13,
wherein the maximum value of the gap between the pair of left and right second synthetic resin materials forming the lower part in the left-right direction is three times or less the minimum value of the gap in the left-right direction.

15. The molded foam body according to claim 13,
wherein the gap between the pair of left and right second synthetic resin materials forming the lower part in the left-right direction smoothly changes rearward from a front end part of the lower part without a step.

16. The molded foam body according to claim 14,
wherein the gap between the pair of left and right second synthetic resin materials forming the lower part in the left-right direction smoothly changes rearward from a front end part of the lower part without a step.

17. The molded foam body according to claim 13,
wherein a hardness of the second synthetic resin material is 1.2 times or more and 3.5 times or less a hardness of the first synthetic resin material.

18. The molded foam body according to claim 14,
wherein a hardness of the second synthetic resin material is 1.2 times or more and 3.5 times or less a hardness of the first synthetic resin material.

19. The molded foam body according to claim 13, comprising:
a body part having the thigh rest part and the hip rest part;
a pair of left and right side parts that are connected to the body part on both sides in the left-right direction and are formed of a foam of the second synthetic resin material; and
an attachment part that projects rearward integrally from the body part and the side parts,
wherein the body part has a non-contact part that connects a rear end part of the hip rest part and the attachment part, and
wherein lateral grooves extending in the left-right direction are formed in parts of the side parts adjacent to the non-contact part in the left-right direction.

* * * * *